US008023512B2

(12) United States Patent
Kojima

(10) Patent No.: US 8,023,512 B2
(45) Date of Patent: Sep. 20, 2011

(54) COMMUNICATION DEVICE

(75) Inventor: Atsushi Kojima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 964 days.

(21) Appl. No.: 11/641,684

(22) Filed: Dec. 20, 2006

(65) Prior Publication Data

US 2007/0147383 A1 Jun. 28, 2007

(30) Foreign Application Priority Data

Dec. 22, 2005 (JP) ................................. 2005-370245

(51) Int. Cl.
*H04L 12/28* (2006.01)
*G06F 9/00* (2006.01)
(52) U.S. Cl. .......................................... 370/392; 726/13
(58) Field of Classification Search .................. None
See application file for complete search history.

(56) References Cited

U.S. PATENT DOCUMENTS

| 6,009,475 | A  | * | 12/1999 | Shrader ......................... 709/249 |
| 7,116,675 | B2 |   | 10/2006 | Tateoka |
| 2004/0098620 | A1 | * | 5/2004 | Shay ............................. 713/201 |
| 2004/0172557 | A1 | * | 9/2004 | Nakae et al. ................... 713/201 |
| 2005/0010821 | A1 | * | 1/2005 | Cooper et al. ................. 713/201 |
| 2006/0174342 | A1 | * | 8/2006 | Zaheer et al. ................... 726/23 |
| 2007/0204154 | A1 | * | 8/2007 | Swander et al. .............. 713/166 |

FOREIGN PATENT DOCUMENTS

| JP | A-6-261057 | 9/1994 |
| JP | A 10-240687 | 9/1998 |
| JP | A-11-55292 | 2/1999 |
| JP | A 11-219310 | 8/1999 |
| JP | A 2001-36561 | 2/2001 |
| JP | A-2001-134845 | 5/2001 |
| JP | A-2002-63084 | 2/2002 |
| JP | A-2005-27040 | 1/2005 |
| JP | A-2005-182187 | 7/2005 |
| WO | WO 02/067512 A1 | 8/2002 |

OTHER PUBLICATIONS

Network Ingress Filtering: Defeating Denial of Service Attacks Which Employ IP Source Address Spoofing / Paul Ferguson—Cisco Systems, Inc. And Daniel Senie—Amaranth Networks Inc. / May 20, 2000.*
Japanese Office Action for Application No. 2005-370245, Issued Apr. 7, 2009.

* cited by examiner

*Primary Examiner* — Ayaz Sheikh
*Assistant Examiner* — Sori Aga
(74) *Attorney, Agent, or Firm* — Oliff & Berridge PLC

(57) ABSTRACT

A communication device includes a receiving unit, a setting storage unit that stores information to represent a source address of a packet to be discarded, a discard determination unit that determines whether a packet received by the receiving unit should be discarded based on the information stored in the setting storage unit, a transmission control unit that discards a packet determined to be discarded and transmits downstream a packet determined not to be discarded, a report unit that reports information on discarding of a packet to a predetermined report destination when the packet is to be discarded, a report history storage unit that stores the source address of the packet as a cause of report when the report unit reports the information, and a report necessity determination unit that determines whether information on discarding of a packet needs to be reported.

5 Claims, 8 Drawing Sheets

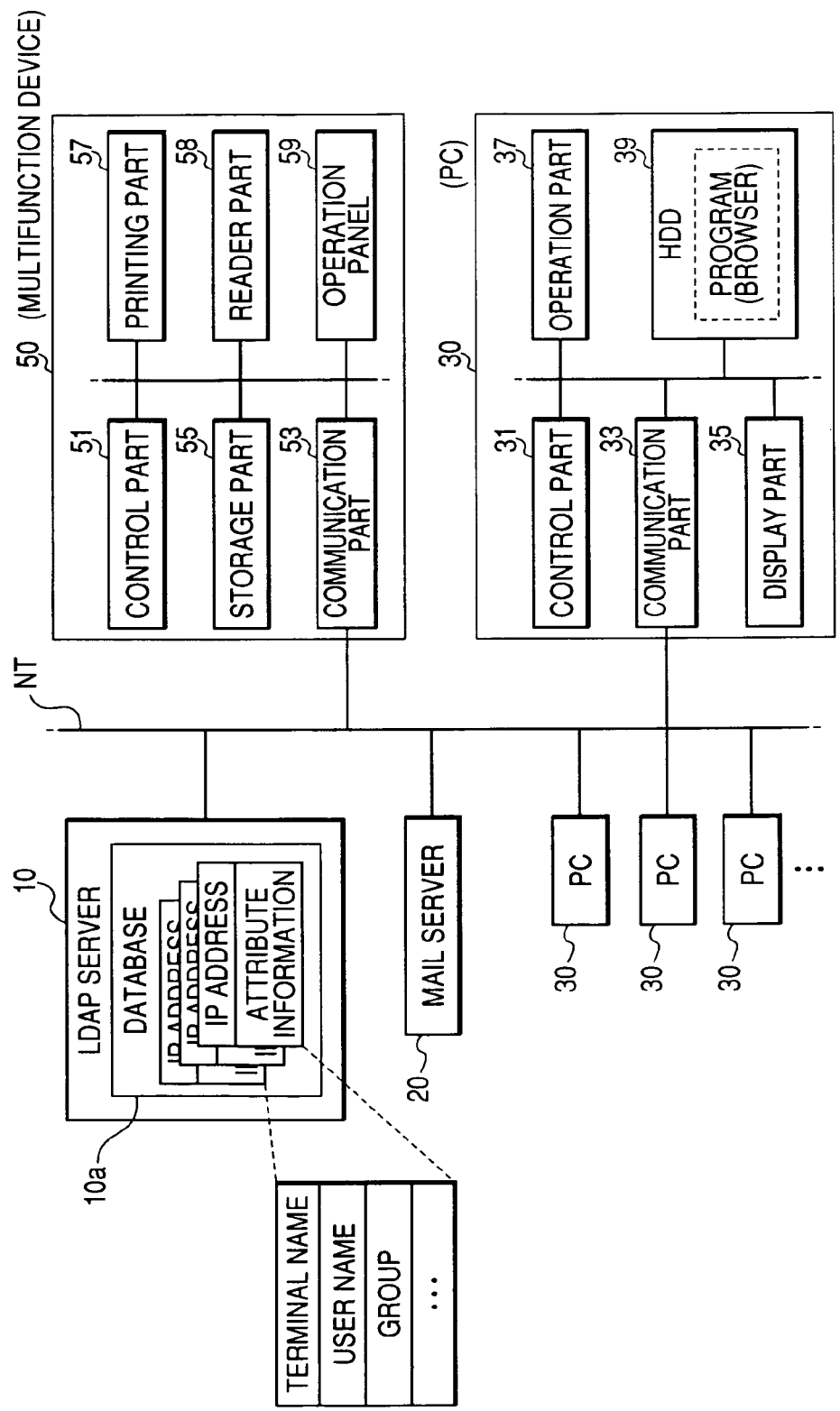

- ⦿ AUTOMATIC SETTING UPDATE   ON
- ◯ AUTOMATIC SETTING UPDATE   OFF(REPORT TO ADMINISTRATOR)

| LDAP SERVER ADDRESS | 192.168.100.100 |
| ADMINISTRATOR MAIL ADDRESS | admin@****.jp |
| REPORT INTERVAL | 5 MINUTES |

OK   Cancel

FIG. 6

THERE IS AN ACCESS FROM THE DEVICE BELOW.
TO ENABLE AN ACCESS FROM THE DEVICE,
ACCESS THE FOLLOWING URL AND UPDATE THE SETTING.

ACCESS SOURCE IP ADDRESS: 192.168.*.*

NUMBER OF PACKETS FROM THE ACCESS SOURCE: 1

< ACCESS SOURCE DETAILED INFORMATION >

MAC Address: XX:XX:XX:XX:XX:XX

Name: PC1

User: suzuki

Group: 1G

< ACCESS TARGET DEVICE INFORMATION >

Name: PRINTER1

Printer type: HL-****

Device type: Color Lser Printer

IP Address: 192.168.*.*

Device Serial Number: ******

URL: http://192.168.*.*/Printer/main.html

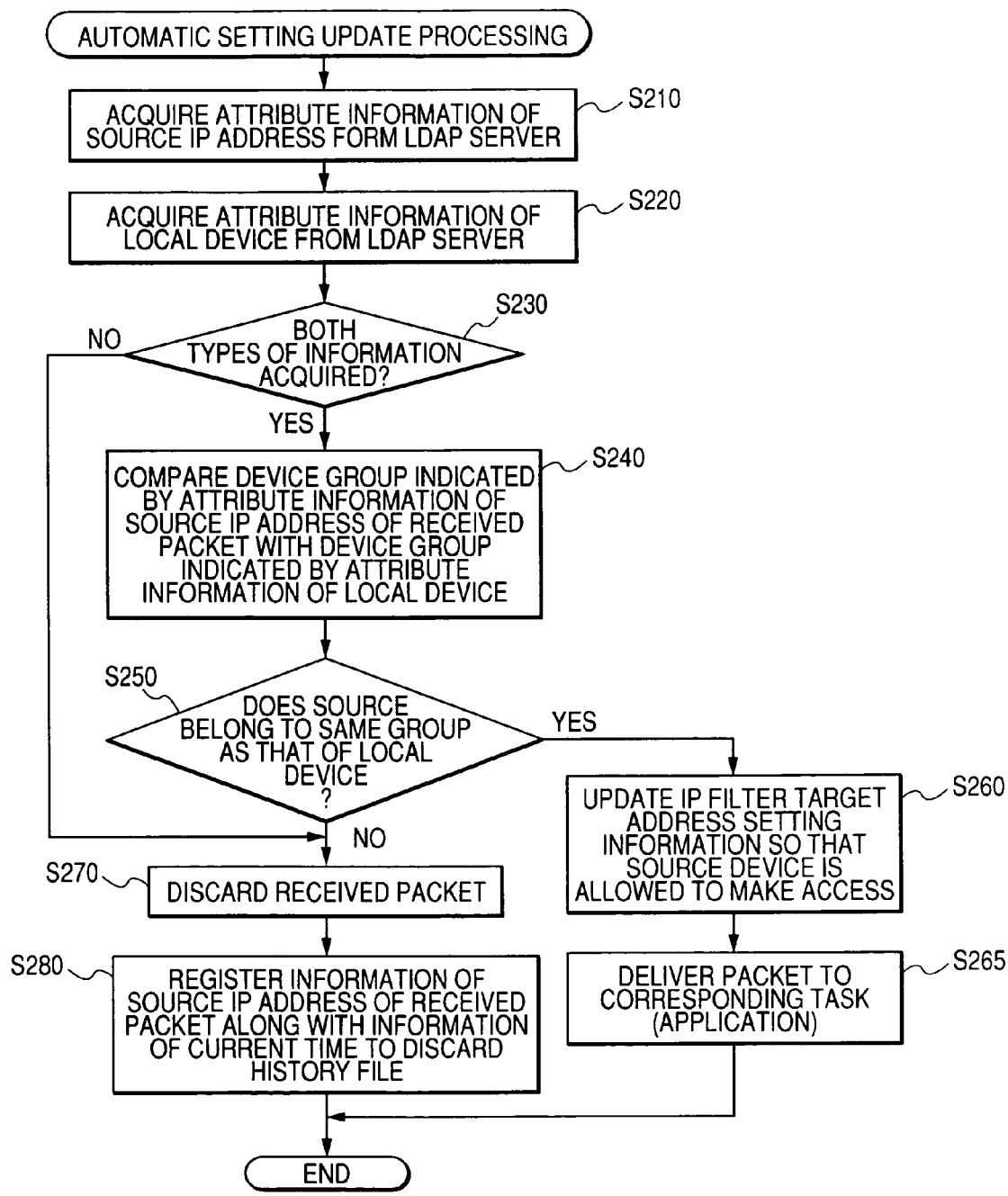

FIG. 8

| IP ADDRESS | TERMINAL NAME | USER NAME | GROUP |
|---|---|---|---|
| 192.168.*.* | PC1 | suzuki | 1G | ← DISCARD TARGET
| 192.168.*.* | PC2 | yamada | 2G | ← NON-DISCARD TARGET
| 192.168.*.* | PC3 | sato | 3G | ← NON-DISCARD TARGET
| ... | ... | ... | ... |
| 192.168.*.* | PRINTER 1 | – | 2G, 3G | ← ATTRIBUTE INFORMATION OF MULTIFUNCTION DEVICE
| ... | ... | ... | ... |

COMMUNICATION DEVICE

CROSS-REFERENCE TO RELATED APPLICATION

This application claims priority from Japanese Patent Application No. 2005-370245, filed Dec. 22, 2005, the contents of which are hereby incorporated by reference into the present application.

TECHNICAL FIELD

Aspects of the present invention relate to a communication device having a function (filtering function) to discard a specific packet among received packets.

BACKGROUND

In the related art, there is known an IP (Internet Protocol) network as a communication network. As a communication device of such a network, there is known a communication device (such as a router) having a function to discard a predetermined packets among received packets to prevent it from being transmitted downstream (for example, see JP-A-2001-36561).

According to such a communication device having a filtering function, it is possible to prevent an unauthorized access from outside thus enhancing the security in the network.

SUMMARY

Aspects of the invention provide a communication device capable of efficiently managing setting information on the filtering function and promptly correcting a setting error even in the absence of an inquiry from the user.

BRIEF DESCRIPTION OF THE DRAWINGS

FIG. 1 is a block diagram showing the configuration of a communication system according to an aspect of the invention;

FIG. 6 shows an example of information on discarding of a packet described in an e-mail;

FIG. 7 is a flowchart of automatic setting update processing performed by the control part; and FIG. 8 is an explanatory drawing showing an example of attribute information stored in an LDAP server.

DETAILED DESCRIPTION

[General Overview]

Figure 2A:
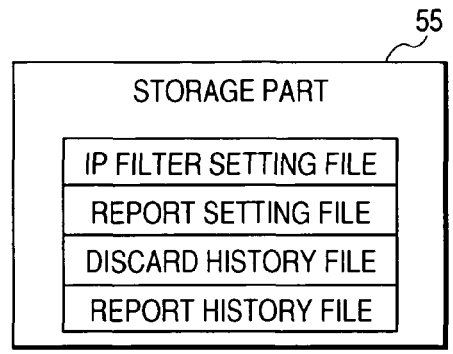
FIGS. 2A to 2D are explanatory drawings showing various types of information stored in a storage part.

According to an aspect of the invention, there is provided a communication device comprising: a receiving unit that receives a packet transmitted from outside via a network; a setting storage unit that stores discard address definition information as information to represent the source address of a packet to be discarded; a discard determination unit that determines whether a packet received by the receiving unit should be discarded based on the discard address definition information stored in the setting storage unit; and a transmission control unit that discards a packet determined to be discarded by the discard determination unit and transmits downstream a packet determined not to be discarded by the discard determination unit. The term "downstream" used herein refers to the final destination of a packet, in particular a device or a task.

The communication device further comprises a report unit, a report history storage unit and a report necessity determination unit. The report unit reports information on discarding of a packet to a predetermined report destination in case the packet is to be discarded by the transmission control unit. The report history storage unit stores the source address of a packet as a cause of report in case the report unit reports the information.

The report necessity determination unit determines whether information on discarding of a packet needs to be reported in response to discarding of the packet by the transmission control unit based on a storage content of the report history storage unit. That is, the report unit reports information on discarding of a packet to the predetermined report destination only concerning discarding of a packet determined necessary to be reported in accordance with the determination result of the report necessity determination unit.

With this communication device thus configured, in case a packet is discarded, information on the discarding of the packet is reported to a predetermined report destination. The administrator can receive a report and correct, as required, setting information (discard address definition information) on the source address of a packet to be discarded as long a report destination is previously set to allow checkup by the administrator. According to the communication device, the administrator can promptly correct setting information on the source of a transmit packet without an inquiry by the user even in case the transmit packet from a terminal device that should have been authorized an access is preset as a discard target.

In particular, according to the communication device, it is determined whether to transmit a report based on the storage content of the report history storage unit. It is thus unnecessary to perform report operation more than once on unauthorized packets continuously transmitted via external attack. According to the communication device, it is possible to prevent an important report (attributable to a setting error of discard address definition information) from being overlooked by the administrator due to unnecessary reporting that springs from an external attack, thereby allowing the administrator to efficiently manage the communication device (discard address definition information).

The report necessity determination unit may determine it is necessary to transmit information on discarding of a packet from the same source address to be discarded in case information on such a packet has not been transmitted a predetermined number of times, and may determine it is unnecessary to transmit information on discarding of a packet from the same source address to be discarded in case information on such a packet has been-transmitted at least a predetermined number of times.

The report necessity determination unit may be configured to determine, in case a packet is discarded by the transmission control unit, whether information on discarding of a packet having the same source address as this packet has been reported by the report unit based on the storage content of the report history storage unit and in case information on discarding of the packet has been reported, determines it is not necessary to report information on discarding of the packet, and in case information on discarding of the packet has not been reported, determines it is necessary to report information on discarding of the packet.

The electronic control device thus configured does not transmit a report each time a packet from the same source address is discarded more than once. Even in case a plurality of packets are transmitted from the same source in succession due to an external attack, numerous report operations do not take place accordingly. Thus the administrator can effectively manage the communication device (discard address definition information) based on report information.

Packets transmitted at periods are expected to be non-malicious. Even in case information on discarding of a packet from the same source address has been transmitted by the report unit, information on discarding of a packet may be transmitted in case a period has elapsed since last report.

The communication device may include an elapsed time calculation unit that calculates an elapsed time from execution of each communication operation that caused the report history storage unit to store a source address. The report necessity determination unit may determine the necessity to report information on discarding of a packet in case it is determined that a predetermined time has elapsed since last report of information on discarding of the packet from the same address of a packet to be discarded based on the calculation result of the elapsed time calculation unit, even in case information on discarding of a packet having the same source address as that of the packet discarded has been reported.

With the communication device thus configured, it is possible to transmit a report again to engage the administrator to re-check whether a packet has been discarded due to a setting error.

The report unit preferably report, as information on discarding of a packet, information including the source address of a packet to be discarded instead of information simply indicating discarding of a packet. With the communication device thus configured, the administrator can recognize the source address of a discarded packet based on the reported information without directly referencing the report history storage unit and promptly determine whether the discard address definition information includes a setting error.

Information on discarding of a packets preferably reported via an e-mail as a medium. The communication device may comprise a destination registration acceptance unit that accepts registration of an e-mail address as the destination, wherein the report unit reports information on discarding of the packet to an e-mail address accepted by the destination registration acceptance unit via an e-mail as a medium.

With the communication device thus configured, the administrator may acquire information on the discarding of a packet via an e-mail from any terminal device located in an environment where an access to a mail server is available, once the administrator has registered a regular mail address and promptly discard address definition information based on the reported information.

In case information on discarding of a packet such as information that includes a source address is reported to the administrator, the administrator may have difficulty in grasping whether there is a setting error. In case a database server (so-called directory server) is provided that stores the attribute information of each terminal device in a network in association with a node address assigned to each terminal device, the attribute information is preferably utilized. The attribute information includes user information and information representing a group the terminal device belongs to.

The communication device may comprise attribute information acquisition unit that acquires attribute information corresponding to the source address of a packet discarded by transmission control unit from the database server, wherein the report unit reports information including the attribute information on the corresponding packet acquired by the attribute information acquisition unit as information on discarding of the packet. With the communication device thus configured, the administrator can determine more appropriately and promptly whether discard address definition information must be corrected based on the report content. Thus, management of a communication device (discard address definition information) is made easier.

According to another aspect of the invention, there is provided a communication device connected to a network having the database server comprising: a receiving unit that receives a packet transmitted from outside via a network; a setting storage unit that stores discard address definition information as information to represent the source address of a packet to be discarded; a discard determination unit that determines whether a packet received by the receiving unit should be discarded based on the discard address definition information stored in the setting storage unit; and a transmission control unit that discards a packet determined to be discarded by the discard determination unit and transmits downstream a packet determined not to be discarded by the discard determination unit.

The communication device further comprises an attribute information acquisition unit, an exclusion determination unit, and a setting update unit. When the receiving unit has received a packet, the attribute information acquisition unit acquires the attribute information of the source device of the packet based on the source address indicated by the packet. The exclusion determination unit determines whether to set a packet having as a source address a node address corresponding to the attribute information to a non-discard target. Once the packet is determined to be set to a non-discard target by the exclusion determination unit, the setting update unit updates the discard address definition information stored in the setting storage unit so that a packet having as a source address the corresponding node address is set to be a non-discard target.

The communication device can automatically and appropriately correct the discard address definition information in case it is obvious that a packet from the source address corresponding to the attribute information should not be discarded based on the attribute information of the database server. Thus, according to the communication device, it is possible to effectively manage setting information on the source address of a packet to be discarded (discard address definition information) and promptly correct a setting error in the absence of an inquiry from the user.

The communication device may acquire the attribute information of all source devices of packets received by the receiving unit and determine whether the packets are to be discarded. Alternatively, the communication device may transmit downstream a packet determined not to be discarded by the discard determination unit based on the discard address definition in formation stored in the setting storage unit. With the communication device thus configured, a packet previously determined not to be discarded may be transmitted downstream without attribute information being acquired from the database server thereby preventing a possible delay in packet transmission.

The transmission control unit may discard a packet determined to be set to a non-discard target by the exclusion determination unit rather than transmit it until the discard address definition information is corrected. Preferably, the transmission control unit transmits downstream a packet determined to be set to a non-discard target by the exclusion determination unit rather than discard it.

The communication device may be configured such that the attribute information acquisition unit acquires from the database server the attribute information of the source device of a packet determined to be discarded by the discard determination unit among the packets received by the receiving unit and the transmission control unit transmits downstream a packet determined to be set to a non-discard target by the exclusion determination unit among the packets determined to be discarded by the discard determination unit and discard the remaining packets rather than transmit them downstream.

With the communication device thus configured, a packet determined to be discarded by the discard determination unit due to a setting error of discard address definition information is not discarded. This prevents an access from an authorized user from being inappropriately inhibited.

The communication device may comprise a discard history storage unit that stores the source address of a packet discarded by the transmission control unit. With the communication device thus configured, the administrator can recognize the source address of a discarded packet by referencing the discard history storage unit and manually correct the discard address definition information that cannot be appropriately corrected depending on the attribute information in the database server.

[Illustrative Aspect]

An illustrative aspect of the invention will be described referring to drawings.

FIG. 1 is a block diagram showing the configuration of a communication system 1. The communication system 1 according to this aspect comprises: an LDAP (Lightweight Directory Access Protocol) server 10 as a database server for storing the attribute information of each terminal device in a TCP/IP network NT; a mail server 20; a plurality of personal computers (hereinafter referred to as the PC) 30; and a digital multifunction device (hereinafter referred to as the multifunction device) 50 connected to each other.

The LDAP server 10 includes a database 10a for storing the attribute information of each terminal device (PC 30 or multifunction device 50) in the network NT in association with the IP address assigned to each terminal device. The database 10a stores the information indicating the name of the terminal device, the name of the main user of the terminal device, and the group each terminal device belongs to. Receiving a request signal requesting attribute information from a device in the network NT, the LDAP server 10 returns the attribute information associated with the IP address specified by the request signal.

Same as a known PC, each PC 30 comprises: a control part 31 including a CPU, a ROM and a RAM; a communication part 33 capable of communicating with each device in the network NT; a display part 35 including a liquid crystal monitor; an operation part 37 including a keyboard and a pointing device; and a hard disk drive (HDD) 39 for storing programs or data. Each PC 30 executes, on a control part (CPU), various program such as mail browser software in accordance with an instruction from the user.

The multifunction device 50 includes; a control part 51 including a CPU, a ROM and a RAM; a communication part capable of communicating with each device in the network NT; a storage part 55 including a flash memory for storing setting information; a printing part 57 for forming an image on paper by way of a laser system or an ink-jet system; a reader part 58 for optically reading an original placed on an original placing part and generating image data; and an operation panel including various keys and displays operated by the user.

The multifunction device 50 executes various programs on the control part 51 to provide a printer function, a scanner function and a copy function. For example, the control part 51, receiving a print command from outside via the network NT, prints the print data received at the same time and forms on paper a print image that is based on the print data via the printer part 57 (printer function). The control part 51, on input of a read command from outside via the operation panel 59, control the reader part 58 to read the original placed on the original placing part and generate image data representing the read image, and stores the image data into a predetermined device in the network NT (scanner function).

The multifunction device 50 provides a filtering function (hereinafter referred to as the IP filtering function) on the control part 51 that discards a specific packet rather than transmit it downstream among the packets received by the communication part 53 based on the setting information stored in the storage part 55. FIGS. 2A to 2D show various setting information stored in the storage part 55. FIG. 3 explains the IP filtering function.

Figure 2B:
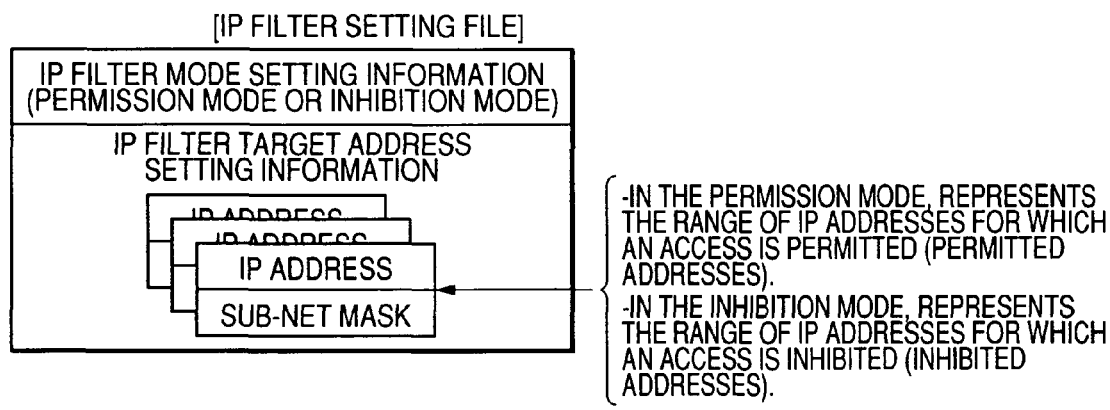
Figure 3:
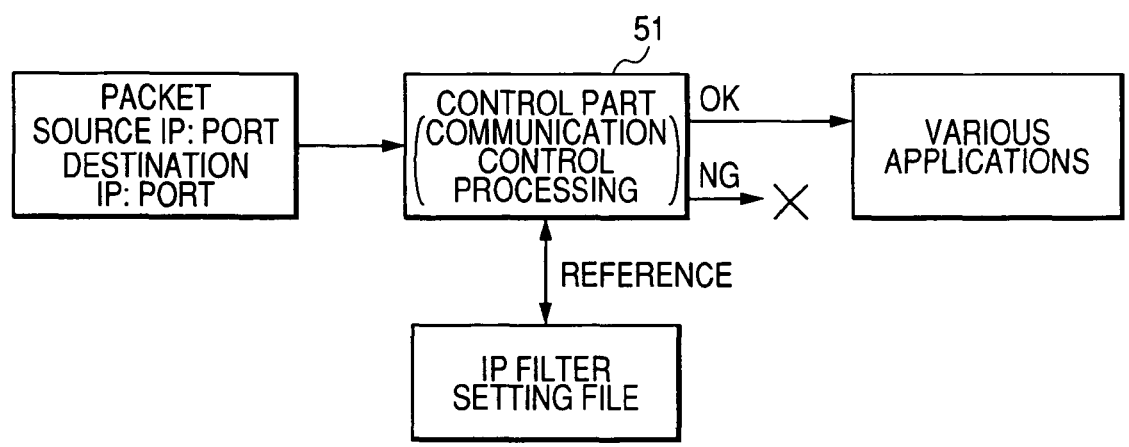
FIG. 3 is an explanatory drawing showing an IP filtering function.

As shown in FIG. 2A, the multifunction device 50 has an IP filter setting file describing setting information on the IP filtering function in the storage part 55. As shown in FIG. 2B, the IP filter setting file includes IP filter mode setting information and IP filter target address setting information. The IP filter mode setting information serves as setting information to switch between operation modes of IP filtering function. In particular, the IP filter mode setting information takes either a value representing a permission mode or a value representing an inhibition mode. In case the IP filter mode setting information indicates the permission mode, the control part 51 recognizes that an IP address in the range indicated by the IP filter target address setting information is a permitted address and that an IP address out of this range is an inhibited address, and discards a packet received from a device in the network to which an inhibited address is assigned.

In case the IP filter mode setting information indicates the inhibition mode, the control part 51 recognizes that an IP address in the range indicated by the IP filter target address setting information is an inhibited address and that an IP address out of this range is a permitted address, and discards a packet received from a device in the network to which an inhibited address is assigned.

The IP filter target address setting information indicates the range of IP addresses corresponding to permitted addresses (for the permission mode) or the range of IP addresses corresponding to inhibited addresses (for the inhibition mode) by way of a combination of an IP address and a sub-net mask. As shown in FIG. 3, based on the content of the IP filter setting file having such setting information, the control part 51 discards a specific packet and transmits the remaining packets to a downstream task. In other words, the control part 51 determines whether to discard a received packet based on the source IP address of the received packet and setting information indicated by the IP filter setting file. In case it has determined that a received packet should not be discarded, the control part 51 transmits the received packet to a task (application) corresponding to a port number indicated as a destination by the received packet. In case it has determined that a received packet should be discarded, the control part 51 discards the packet without transmitting the received packet to a downstream task.

Figure 2C:
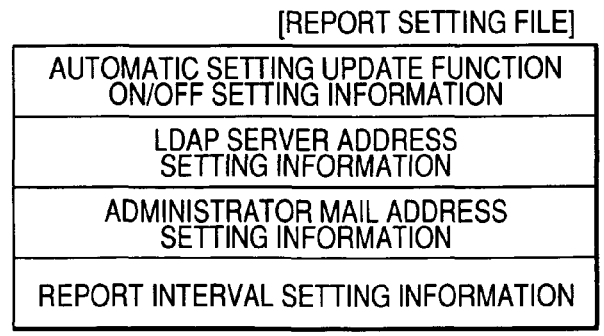

The storage part 55 has a report setting file apart from an IP filter setting file. The control part 51 reports, as required, the information on discarding of a packet to a mail address indicated by the communication setting file by way of an e-mail as a medium. FIG. 2C is an explanatory drawing showing the structure of the report setting file stored in the storage part 55.

As shown in FIG. 2C, the communication setting file includes automatic setting update function on/off setting information, LDAP server address setting information, administrator mail address setting information, and report interval setting information.

The automatic setting update function on/off setting information is setting information for turning ON/OFF automatic setting update function (detailed later) as a function to automatically update the IP filter target address setting information and takes a value indicating ON or a value indicating OFF. In case the automatic setting update function on/off setting information indicates ON, the control part 51 performs processing related to the automatic setting update function (automatic setting update processing). In case the automatic setting update function on/off setting information indicates OFF, the control part 51 performs processing for reporting information on discarding of a packet instead of processing related to the automatic setting update function.

The LDAP server address setting information indicates the IP address of an LDAP server 10 having the attribute information of a terminal device necessary for the automatic setting update function. When performing processing related to the automatic setting update function, the control part 51 transmits a request signal to request attribute information to the IP address indicated by the LDAP server address setting information to acquire necessary attribute information from the LDAP server 10 of the distant party.

The administrator mail address setting information is information indicating the destination mail address of the information related to discarding of a packet. In case the automatic setting update function is turned OFF, the control part 51 reports, as required, information on discarding of a packet to the mail address indicated by the administrator mail address setting information. The report interval setting information is information indicating the report interval of information on discarding of a packet. In case the source IP address has received a same packet more than once, the control part 51 does not transmit information on discarding of a packet again unless the time corresponding to the report interval indicated by the report interval setting information has elapsed.

The storage part 55 has a report history file and a discard history file. On top of reporting the information on discarding of a packet, the control part 51 records the source IP address of a packet that triggered reporting into the report history file. The control part 51 records the source IP address of a packet to be discarded into the discard history file irrespective of the report operation.

Figure 2D:
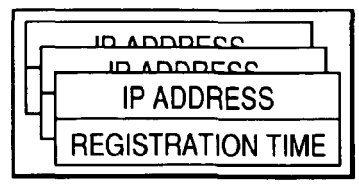

FIG. 2D is an explanatory drawing showing the structure of the report history file and the discard history file. To the report history file and the discard history file are sequentially written records each composed of a source IP address and registration time by the control part 51. The control part 51 can display the content of the report history file and report the discard history file on the display part of the operation panel 59 in accordance with an instruction from the user.

Figures 4A, 4B:
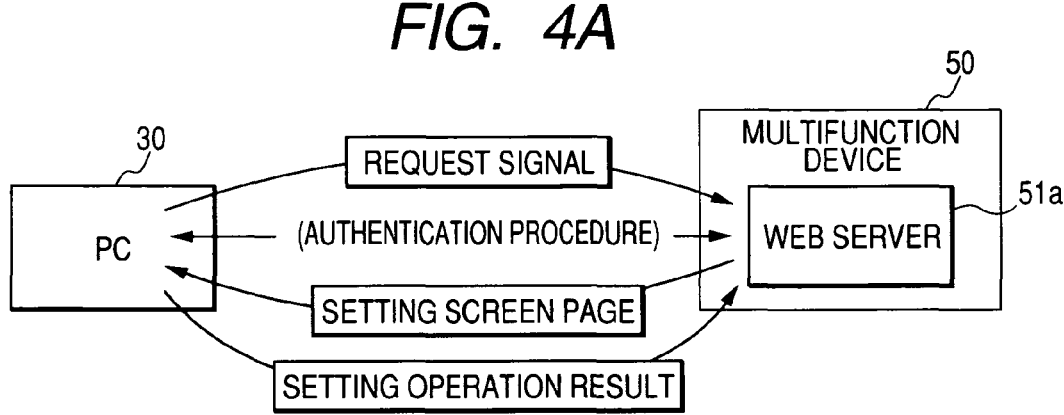
FIG. 4A is an explanatory drawing of a method to update various setting information stored in the storage part.
FIG. 4B is an explanatory drawing showing the layout of a report setting screen.

FIG. 4A is an explanatory drawing of a method for updating various setting information stored in the storage part 55. The multifunction device 50 according to this aspect provides a function as a web server 51*a* on the control part 51 and transmits a setting screen for accepting update operation of setting information to the PC 30 of the administrator 30 in the form of a web page.

Specifically, FIG. 4A is an explanatory drawing showing the procedure for accepting the update operation of setting information. The web server 51*a*, receiving a request signal for a setting screen from the PC 30, transmits a web page requesting the administrator to input a password to the PC 30 of the requester, acquires a password from the PC 30 of the administrator, and compares the password with a password (not shown) stored in the storage part 55. In case both passwords have matched each other, the web server 51*a* assumes successful authentication and transmits a web page including a setting screen to the PC of the requester.

For example, in case it has received a signal to request the IP filter setting screen via the communication part 53, the web server 51*a* transmits a web page including a setting screen (IP filter setting screen) that accepts update operation of setting information in the IP filter setting file to the PC 30 of the requester. In case it has received a signal to request the communication setting screen via the communication part 53, the web server 51*a* transmits a web page including a setting screen that accepts update operation of setting information in the communication setting file to the PC 30 of the requester. FIG. 4B is an explanatory drawing showing the layout of the report setting screen.

As shown in FIG. 4B, the setting screen includes an "OK" button for returning the result of input to the setting screen to the multifunction device 50. When the OK button is pressed by the administrator, the result of input to the setting screen is returned from the PC 30 of the administrator to the multifunction device 50. The web server 51*a* updates the corresponding setting information based on the input result and accepts the update operation from the administrator.

Figure 5:
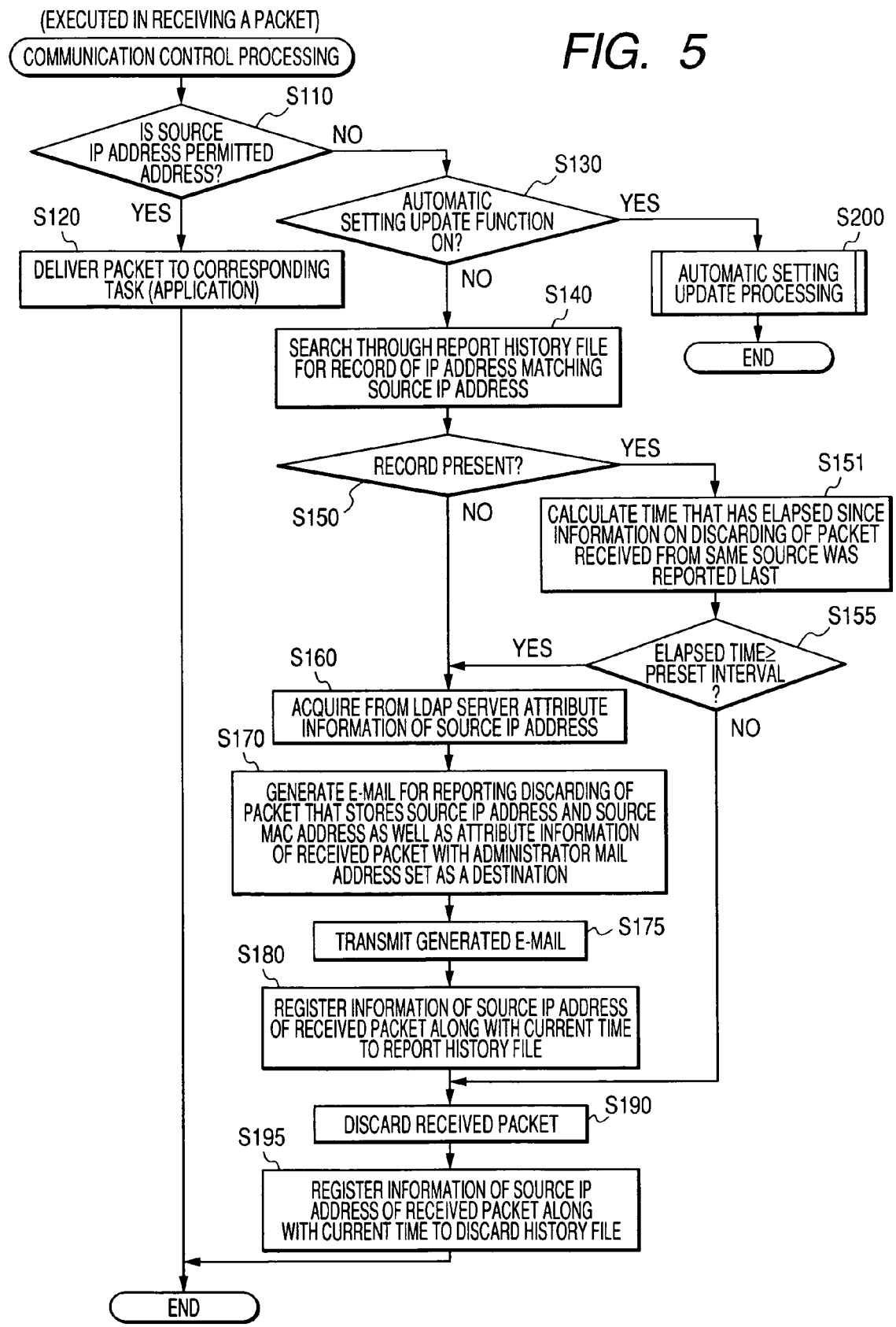
FIG. 5 is a flowchart of communication control processing performed by a control part.

Next, the IP filtering function will be detailed referring to FIG. 5. FIG. 5 is a flowchart showing the communication control processing performed by the control part 51 each time the communication part 53 receives a packet destined to it from outside. The communication control processing is performed by the control part 51 before the received packet is transmitted to a downstream task (application).

When the communication part 53 receives a packet from outside via the network NT, the control part 51 determines whether the source IP address indicated by the received packet is a permitted address based on the IP filter mode setting information and IP filter target address setting information stored in the storage part 55 (S110). In case it has determined that the source IP address indicated by the received packet is a permitted address (Yes in S110), the control part 51 transmits (delivers) the received packet to a task (application) corresponding to the port number of the destination indicated by the received packet (S120). The control part 51 then terminates the communication control processing.

In case it has determined that the source IP address indicated by the received packet is not a permitted address (is an inhibited address) (No in S110), the control part 51 determines whether the automatic setting update function is set to ON based on the automatic setting update function on/off setting information stored in the storage part 55 (S130).

In case it has determined that the automatic setting update function is not set to ON (is set to OFF) (No in S130), the control part 51 searches through the communication history file stored in the storage part 55 for a record including information of the IP address matching the source IP address indicated by the currently received packet. In case the control part 51 has determined that the record is not present in the communication history file as a result of search (No in S150), execution proceeds to S160.

In case it has determined that the record is present in the communication history file (Yes in S150), the control part 51 calculates, based on the content of the report history file, the time that has elapsed since the information on discarding of a packet received from the same source as the source IP address indicated by the currently received packet was reported last (S151), and determines whether the elapsed time is equal to or more than the interval indicated by the report interval setting information stored in the storage part 55 (S155).

In case the control part 51 has determined that the elapsed time is equal to or more than the interval indicated by the report interval setting information (Yes in S155), execution proceeds to S160. In case the control part 51 has determined that the elapsed time is less than the interval indicated by the report interval setting information (No in S155), execution proceeds to S190.

In S160, the control part 51 acquires the attribute information associated with the IP address matching the source IP address indicated by the currently received packet from the LDAP server 10 based on the LDAP server address setting information. When the control part 51 acquires the attribute information, execution proceeds to S170 and control part 51 generates an e-mail describing information on discarding of a packet having as a destination a mail address indicated by the administrator mail address setting information in the storage part 55. FIG. 6 shows an example of information on discarding of a packet described in the e-mail.

In particular, in S170, the control part 51 generates an e-mail describing, as information on discarding of a packet, the source IP address of the currently received packet, the MAC address of the source and the attribute information (name of the terminal device, name of the main user, and the group the terminal device belongs to) of the source IP address acquired from the LDAP server 10.

In S170, the control part 51 adds to the e-mail the access target device information as the device information on the multifunction device 50 accessed and link information to the IP filter setting screen (or link information for transmitting a signal to request the IP filter setting screen). The e-mail also includes the past packet discarding count of a packet coming from the same source of that received this time.

When generation of an e-mail is over, the control part 51 transmits the e-mail to the network NT so that the generated e-mail is delivered to the administrator mail address (S175). When this processing is complete, execution proceeds to S180, where the control part 51 additionally writes the information of the source IP address of the currently received packet along with the information of the registration time (current time) into the report history file.

When processing in S180 is complete, the control part 51 discards the received packet (S190) and additionally writes the information of the source IP address of the received packet along with the information of the registration time (current time) into the discard history file (S195), and terminates the communication control processing.

The control part 51, on determining that the automatic setting update function is set to ON in S130, performs the automatic setting update processing shown in FIG. 7 in S200. FIG. 7 is a flowchart showing the automatic setting update processing performed by the control part 51.

Starting the automatic setting update processing, the control part 51 acquires attribute information associated with the IP address matching the source IP address of a currently received packet from the LDAP server 10 at the address indicated by the LDAP server address setting information (S210) and acquires the attribute information of the multifunction device 50 (S220). Terminating the processing, the control part 51 determines, in S230, whether it has successfully acquired attribute information in S210 and S220. In case it has successfully acquired both types of attribute information, the control part 51 determines Yes in S230 and execution proceeds to S240. Otherwise, the control part 51 determiners No in S230 and execution proceeds to S270.

In S240, the control part 51 compares the device group indicated by the attribute information of the source of the currently received packet with the device group indicated by the attribute information of the local device (multifunction device 50) and determines whether the source of the currently received packet belongs to the same group as the local device (S250). In case it is determined that the source belongs to the same group as the local device (Yes in S250), execution proceeds to S260. Otherwise (No in S250), execution proceeds to S270.

In S260, the control part 51 updates the IP filter target address setting information so that the source device of the currently received packet may access the multifunction device 50. In other words, the control part 51 updates the IP filter target address setting information so that the source address of the currently received packet falls within the range of permitted addresses indicated by the IP filter target address setting information. As a matter of course, the control part 51 updates the IP filter target address setting information so that only the currently received packet will be a new permitted address.

When processing in S260 is over, the control part 51 transmits the currently received packet to at a task (application) corresponding to the destination port number indicated by the packet (S265). The control part 51 then terminates the automatic setting update processing.

In S270, the control part 51 discards the currently received packet and additionally writes the information of the source IP address of the received packet along with the information of the registration time (current time) into the discard history file (S280). The control part 51 then terminates the automatic setting update processing.

In the automatic setting update processing, in case the device groups indicated by the attribute information of the local device are "2G" and "3G", a packet from a terminal device assigned an IP address corresponding to the attribute information indicating that the device group is "2G" or "3G" is not discarded but transmitted to a corresponding task (application), and the IP filter target address setting information is updated so that the IP address of the terminal device will be a permitted address. A packet from a terminal device corresponding to the attribute information indicating a group other than "2G" and "3G" is discarded without the IP address processed as a permitted address.

When the automatic update setting processing is over, the control part 51 terminates the communication control processing.

In the communication system 1 described above, the multifunction device 50 functions as a communication device. When the communication part 53 (corresponding to a receiving unit) receives a packet from outside via the network NT, the control part 51 determines whether the source IP address is a permitted address based on the information in the IP filter setting file (corresponding to discard address definition information). Based on this operation, the control part 51 determines whether to discard the received packet (S110: corresponding to a discard determination unit).

The control part 51 transmits a packet whose source IP address is a permitted address among the received packets to a downstream task (S120) and discards a packet whose source IP address is determined an inhibited address (S190).

When discarding a packet, the control part 51 generates an e-mail describing the source IP address and the attribute information of the source as information on discarding of a packet and transmits the e-mail to a predetermined mail address of the administrator (S160-S175: corresponding to a report unit) When transmitting the e-mail, the control part 51 records the source IP address of the packet as a cause of transmission of the e-mail into the report history file (S180: corresponding to a report history storage unit).

The control part 51 determines whether the information on discarding of a packet needs to be transmitted in association with discarding of the received packet before performing steps S160 through S175 (S150, S155: corresponding to a report necessity determination unit). Only in case it has determined that report is necessary (No in S150 or Yes in S155), the control part 51 transmits the e-mail storing information on discarding of a packet.

When discarding a packet, the multifunction device 50 of this aspect reports information on discarding the packet to a pre-registered mail address via an e-mail as a medium. The administrator has only to previously register his/her mail address via the web server 51a (corresponding to a destination registration acceptance unit) of the multifunction device 50. The administrator is thus able to correct the setting information on the IP filtering function. With the multifunction device 50, the administrator can promptly correct a transmit packet set to a discarding target from a terminal device that has been inhibited an access due to a setting error, without an inquiry from the user.

In particular, the multifunction device 50 according to this aspect calculates the time that has elapsed since the information on discarding of a packet was reported last (S151: corresponding to an elapsed time calculation unit) in case a packet having the same source as a discarded packet for which information on discarding of a packet has been transmitted once is received again. In case the elapsed time is less than a predetermined time, the multifunction device discards the packet rather than transmitting information on discarding of a packet. This eliminates the need for continuously transmitting a report multiple times even in case an authorized packets are continuously transmitted via an external attack. According to this aspect, it is possible to prevent an important report from being overlooked by the administrator due to unnecessary reporting that springs from an external attack, thereby allowing the administrator to efficiently manage the setting information on the IP filtering function.

The multifunction device 50 according to this aspect acquires attribute information corresponding to the source address of a packet to be discarded from the LDAP server 10 (S160: corresponding to an attribute information acquisition unit) and describes the information in an e-mail. This allows the administrator to appropriately and promptly determine whether the setting information on the IP filtering function is to be corrected.

The multifunction device 50 according to this aspect performs, incase the automatic setting update function is turned ON (Yes in S130), automatic setting update processing to acquire the attribute information of the source device of the received packet from the LDAP server 10 based on the source IP address indicated by the received packet (S210: corresponding to the attribute information acquisition unit). The multifunction device 50 the determines whether to set a packet having the same source IP address As that of the currently received packet to a non-discard target (S240-S250: corresponding to an exclusion determination unit). In case it has determined that the packet is to be set to a non-discard target (Yes in S250), the terminal device updates the IP filter target address setting information so that a packet having the same source as that of the currently received packet will be excluded from discarded (S260: corresponding to a setting update unit).

According to this aspect, it is possible to automatically and appropriately correct IP filter target address information in case it is obvious that a packet having a source IP address corresponding to the attribute information in the LDAP server 10 should not be discarded, thereby efficiently managing the setting information of the IP filtering function without the intervention of the administrator.

The multifunction device 50 according to this aspect stores the source address of a discarded packet into the discard history file (corresponding to a discard history storage unit) to allow the administrator to reference the discard history. The administrator can regularly check whether the setting information on the IP filtering function is appropriate by using as a clue the content of the discard history file, thereby constantly maintaining the setting information in an appropriate fashion.

The communication device according to the invention is not limited to the above aspects but may take various forms.

For example, whether to discard a packet may be determined based on the MAC address of a terminal device. While the multifunction device 50 performing packet filtering by using an IP address in the above aspects, the multifunction device 50 may perform packet filtering by using a MAC address.

What is claimed is:

1. A communication device comprising:
   a receiving unit that receives a packet transmitted from outside via a network;
   a setting storage unit that stores discard address definition information as information to represent a source address of a packet to be discarded;
   an interface which allows a user to update the discard address definition information;
   a web server which provides the interface with a web page including a setting screen for accepting update operation of the discard address definition information;
   a discard determination unit that determines whether a packet received by the receiving unit should be discarded based on the discard address definition information stored in the setting storage unit;
   a transmission control unit that discards a packet determined to be discarded by the discard determination unit and transmits downstream a packet determined not to be discarded by the discard determination unit;
   a report unit that reports information on discarding of a packet to a predetermined report destination in case the packet is to be discarded by the transmission control unit, wherein the information on discarding of the packet includes link information to the setting screen;
   a report history storage unit that stores the source address of the packet as a cause of report in case the report unit reports the information; and
   a report necessity determination unit that determines whether information on discarding of a packet needs to be reported in response to discarding of the packet by the transmission control unit based on a storage content of the report history storage unit,
   wherein the report unit reports information on discarding of a packet to the predetermined report destination only concerning discarding of a packet determined necessary to be reported in accordance with the determination result of the report necessity determination unit, wherein the communication device comprises an attribute information acquisition unit that acquires attribute information corresponding to the source address of a packet discarded by the transmission control unit from a database server included in the network for storing the attribute information of each terminal device in the network in association with a node address assigned to each terminal device, and the report unit reports information including the attribute information on the corresponding packet acquired by the attribute information acquisition unit as information on discarding of the packet, and wherein the attribute information includes information of a group to which the terminal device belongs, where the group information is different from IP address.

2. The communication device according to claim 1, wherein the report necessity determination unit determines, in case a packet is discarded by the transmission control unit, whether information on discarding of a packet having a same source address as this packet has been reported by the report unit based on the storage content of the report history storage unit, in case information on discarding of the packet has been reported, the report necessity determination unit determines it is not necessary to report information on discarding of the packet, and in case information on discarding of the packet has not been reported, the report necessity determination unit determines it is necessary to report information on discarding of the packet.

3. The communication device according to claim 2, further comprising an elapsed time calculation unit that calculates an elapsed time from execution of each communication operation that caused the report history storage unit to store a source address, wherein the report necessity determination unit determines the necessity to report information on discarding of a packet in case it is determined that a predetermined time has elapsed since last report of information on discarding of the packet from the same address of a packet to be discarded based on the calculation result of the elapsed time calculation unit, even in case information on discarding of a packet having the same source address as that of the packet discarded has been reported.

4. The communication device according to claim 1, wherein the report unit reports information including the source address of a packet to be discarded as information on discarding of the packet.

5. The communication device according to claim 1, further comprising a destination registration acceptance unit that accepts registration of an e-mail address as the report destination, wherein the report unit reports information on discarding of the packet to an e-mail address accepted by the destination registration acceptance unit via an e-mail as a medium.

* * * * *